Aug. 23, 1932.  H. H. SEMMES  1,873,051
BRAKE TESTING STRUCTURE
Filed May 3, 1929  2 Sheets-Sheet 1
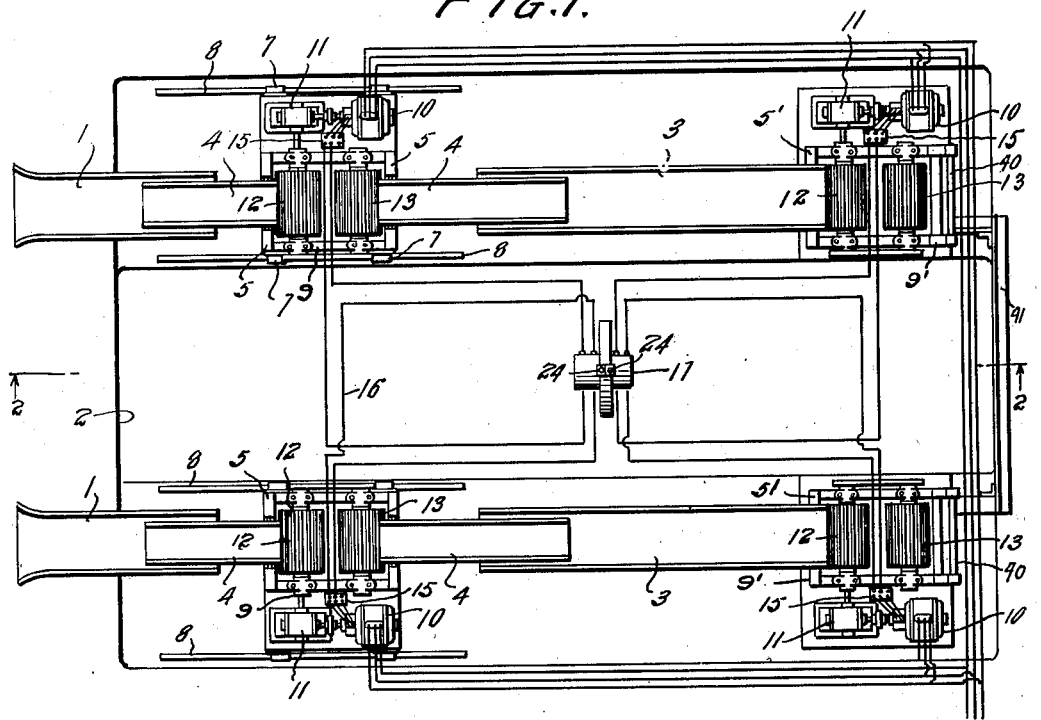
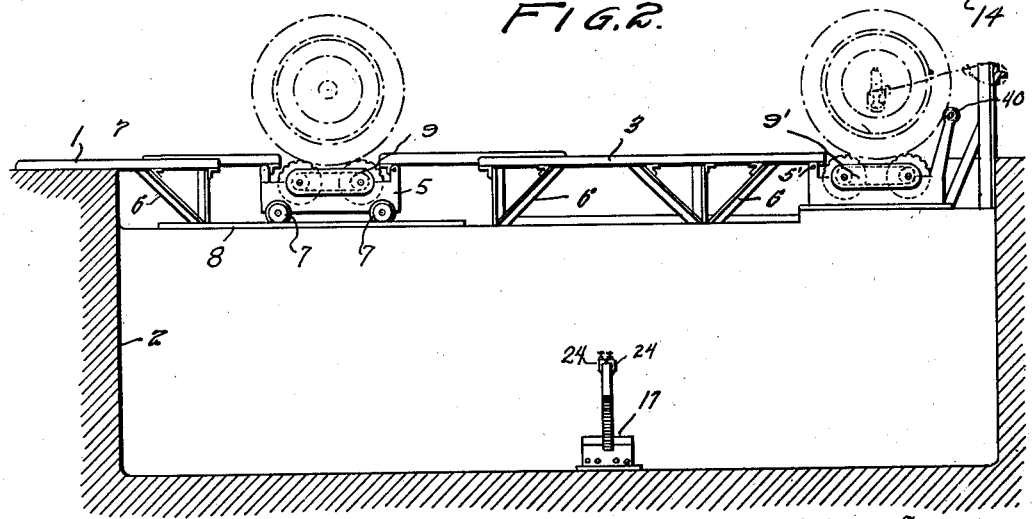
Inventor
HARRY H. SEMMES
By Semmes & Semmes
Attorneys Aug. 23, 1932.  H. H. SEMMES  1,873,051
BRAKE TESTING STRUCTURE
Filed May 3, 1929  2 Sheets-Sheet 2
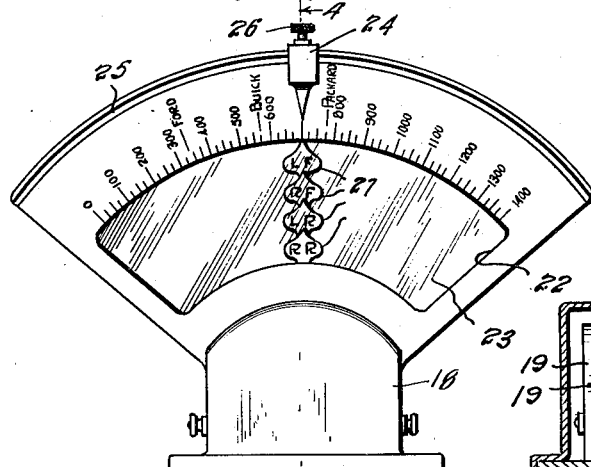
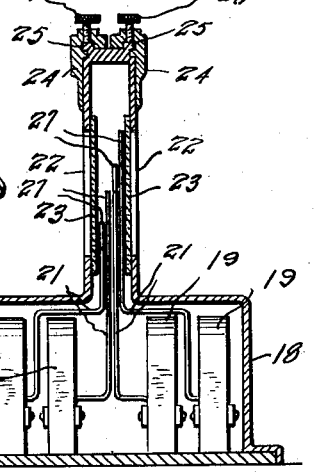
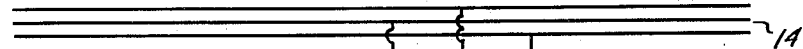
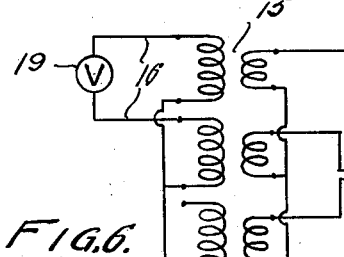
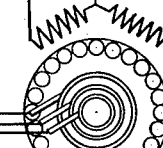
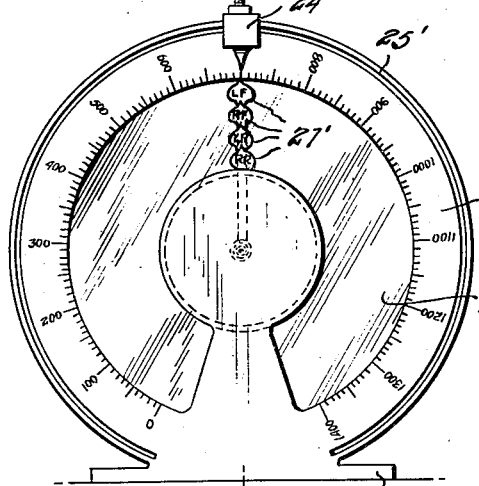
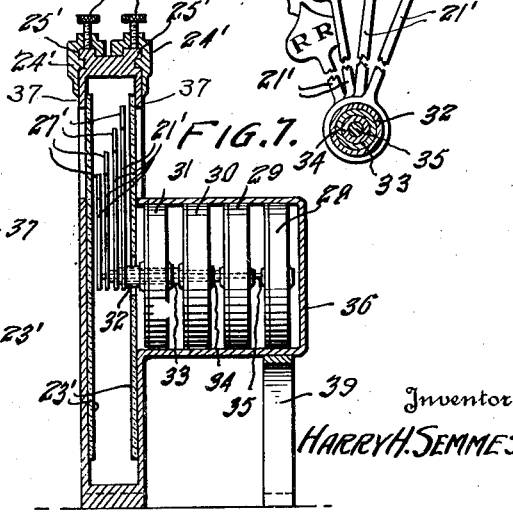
Inventor
HARRY H. SEMMES
By Semmes & Semmes
Attorneys Patented Aug. 23, 1932

1,873,051

UNITED STATES PATENT OFFICE

HARRY H. SEMMES, OF CHEVY CHASE, MARYLAND, ASSIGNOR, BY MESNE ASSIGNMENTS, TO BENDIX-COWDREY BRAKE TESTER, INC., OF NEW YORK, N. Y., A CORPORATION OF DELAWARE

BRAKE TESTING STRUCTURE

Application filed May 3, 1929. Serial No. 360,098.

This invention relates in general to the testing of vehicle brakes, and more particularly has reference to the indication of retardation, or braking effects, as measured by brake testing apparatus.

At present vehicle brakes may be tested by various devices in which mechanical and electrical dynamometers are incorporated. These devices generally consist of a source of power adapted to rotate a vehicle wheel against the resistance of its brake and mechanism for measuring and indicating the brake retardation. The indicating instrument of the testing unit associated with each wheel is generally so positioned that each one must be observed independently.

It will be appreciated that this procedure is very disadvantageous, particularly when all brakes are to be simultaneously tested, or equalized. When testing all brakes simultaneously, or when equalizing the brakes, it is necessary for the mechanic to get out of the pit, or from under the vehicle, to observe the indication and to determine if the brakes are properly adjusted. In most instances it is necessary that the mechanic get in and out of the pit many times before the brakes are all properly adjusted. Also in the construction now in use it is practically impossible for one man to observe the braking effect of all four wheels because of the lack of visibility of the instruments. It is equally difficult to compare the braking effect of several brakes because of the distance between the indicating instruments. Thus in spite of the many improvements in the brake testing art, there have not as yet been any developments which eliminate the above pointed out disadvantages.

A major object of this invention is to devise a method and apparatus for indicating the braking effect of a plurality of vehicle brakes, measured by a plurality of brake testing units on a single instrument.

Another object of this invention is to provide an indicating instrument consisting of a plurality of measuring devices positioned in a casing and provided with individual pointers adapted to be associated with a dial carried by the casing.

Yet another object of this invention is to provide a brake testing structure having a plurality of brake testing units, and a combination instrument associated therewith, adapted to indicate the brake efficiency as measured by each testing unit on one dial.

Still another object of this invention is to provide an instrument adapted to be associated with a plurality of electrical brake testing units for electrically indicating the brake resistance, as measured by each of the testing units.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

The present invention contemplates simultaneously measuring the braking effect of the brakes of all four wheels, and indicating the individual effect of each of the brakes on a single instrument, which is so located as to be visible to mechanics making adjustments on the brakes.

In one embodiment of my invention a plurality of electrical brake testing units are associated with a pit, or a vehicle supporting rack, in such a manner that the braking wheels of the vehicle will be positioned thereon. Connections are provided between the brake resistance measuring device carried by each unit and an indicating device positioned in a desired location, preferably at a place in which it may be easily observed from many points beneath the vehicle. The indicating device consists of a plurality of independently operated measuring instruments provided with individual indicating pointers. The instruments are encased in a housing, and the portion of the housing in which the pointers are located is provided with glazed openings, through which the pointers may be observed. Suitable indicia are placed on the housing, so that the positions of the pointers can be read in terms of brake resistance.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings:

Figure 1 is a plan view of the brake testing structure associated with a testing pit.

Figure 2 is a sectional view taken on line 2—2 of Figure 1, showing the manner in which the indicating instrument may be placed in the testing pit.

Figure 3 is an elevational view of an indicating instrument constructed in accordance with the present invention.

Figure 4 is a sectional view taken on line 4—4 of Figure 3, showing the manner in which the measuring instruments are arranged within the housing of the indicating instrument.

Figure 5 is a diagrammatic illustration of the electrical connections for one of the electrical brake testing units.

Figure 6 is an elevational view of a modified form of an indicating instrument.

Figure 7 is a sectional view taken on line 6—6 of Figure 6, showing the arrangement of the measuring instruments.

Figure 8 is a detailed view showing the construction of the actuating shafts carried by the measuring instruments and the pointers associated therewith.

In the drawings, in which similar reference numerals indicate similar parts throughout the several views thereof, there is shown an apparatus comprising a pair of parallel trackways 1, which are adapted to be positioned over a pit 2, or mounted upon suitable supports. The trackways are preferably channel-shaped in cross-section, and serve to receive the wheels of the vehicle to be tested. Positioned adjacent trackways 1, and aligned therewith, is a set of permanent trackways 3. Fitted in and bridging the space between trackways 1 and 3 are the trackways 4, which are secured to, and are movable with, the carriages 5 of suitable brake testing units 9. Brake testing units 9', secured to the foundation, are positioned adjacent the other end of the trackways 3. As shown in Figure 2, the trackways are supported by suitable structure 6, so that they will be in proper position relative to the pit. The frames of the testing units 9' are provided with bumpers 40, and the testing apparatus is equipped with a bar 41 to which vehicles may be secured when being tested.

The carriages 5 are equipped with rollers or wheels 7, which are mounted on suitable tracks or guideways 8. By this arrangement the carriages 5 may be adjusted as desired, so that the brake testing units carried thereby will be properly positioned to receive the wheels of a vehicle undergoing a test. The adjustable carriages 5 may be moved in any desired manner, such as by the power of the vehicle, or by any other suitable means.

Mounted on the adjustable carriages 5, and on the immovable frames 5', are suitable brake testing units designated generally by numerals 9 and 9'. In the drawings these testing units are shown to be of the electrical type, that is, of the type in which an electric motor is used to drive a vehicle wheel against the resistance of its brakes, and in which the retardation effect of the brake application is measured by measuring the electrical effects produced in the driving motor by the increased load thereon. As shown in the drawings, each of the testing units is provided with an electric motor 10, which is connected through a suitable reduction gearing 11 with a pair of wheel rotating rollers 12 and 13, and connected together by any suitable power transmitting means.

The motors 10 are preferably of the alternating current type, and may be either induction or synchronous motors. In either event, the windings of the motor are tapped, and the potential induced in the windings is measured as indicative of the load applied to the motor by the application of the brakes to a vehicle wheel being rotated by the wheel rotating rollers 11 and 12.

In the case of an induction motor the speed of the motor decreases with the increase in load thereon. In an induction motor there is a revolving flux, which induces current in the rotor of the motor. When the rotor revolves at synchronous speed, there is no induction of current in the rotor winding. If, however, the speed of the rotor falls below that of the revolving field, the lines of force set up by the revolving field are cut by the windings of the rotor, and current is induced therein. Thus by measuring the potential induced in the windings of the rotor, the load on the motor tending to retard the speed of the rotor may be determined.

In the case of the synchronous motor, that is, a motor of the constant speed type, the load on the motor can also be determined by measuring the potential in the windings. The action of the induction of current in the windings is somewhat different in a synchronous than in an induction motor. When a load is applied to a synchronous motor, the rotor will drop back relative to the revolving flux but will rotate at constant speed.

There is a counter E. M. F. set up, which tends to balance that applied to the windings of the motor. The value of the counter E. M. F. will be the same, but the phase relation changed, tending to decrease the effective value of counter E. M. F. and consequently the resultant E. M. F., that is, the difference between the counter and applied E. M. F. will be changed. This change in potential may be utilized for measuring the load applied to the motor. The particular type of brake testing units shown in the drawings are similar to those described in my co-pending application Serial No. 343,756, filed March 1, 1929.

The value of the potential taken from the windings of the motor to be measured as indicative of the load on the motor may be determined directly, or may be passed through a step-up transformer, and then measured by a suitable volt meter, which may be calibrated in terms of brake resistance. As shown in Figure 1, a power line 14 supplies energy to each of the driving motors associated with the four brake testing units. The potential is taken off from the several motors and passed through transformers 15, and then conducted through suitable conduits 16 to an indicating instrument 17.

Figure 5 diagrammatically illustrates the electrical connections of a brake testing unit equipped with an induction motor. As shown, the rotor winding 20 is tapped, and connections are provided to a measuring device, such as a voltmeter.

As hereinbefore pointed out, it is decidedly inconvenient to observe the indication of the brake resistance if indicators are located directly on the testing units. The present invention eliminates this disadvantage by employing a single indicating instrument, which is actuated by each of the four testing units. As is clearly shown in the drawings, this instrument comprises a housing 18 in which is mounted a plurality of measuring instruments 19, each of which is connected with the energy take-off from the driving motor of a testing unit. The instruments 19 are preferably positioned so that the axis of the moving elements thereof will be aligned.

In the form of my invention shown in Figures 3 and 4, the moving elements of the several instruments have pointers 21 fixed thereto. These pointers are shaped so that the indicating ends thereof will be in close proximity to each other. The upper portion of housing 18 is shaped so as to permit the ends of the pointers 21 to move freely therein. Either one or both sides of the upper portion of the housing may be provided with openings 22, through which the position of the several pointers 21 may be observed. These openings are preferably covered with transparent material 23 to protect the instruments and pointers from injury.

The outer surface of the upper portion of the housing adjacent the openings is provided with suitable indicia to represent the position of the pointers. As shown in Figure 3, the range is from 0 to 1400, with numerals positioned at each division, representative of 100. Other division lines, not numbered, are provided for determining positions of the pointers between those numeraled. Other indicia arranged at certain positions on the dial indicate the point at which the pointers should be when the brakes of a particular type of vehicle undergoing a test are properly adjusted. If found desirable the transparent member 23 may be provided with continuations of the lines dividing the dial, to facilitate the reading of the instrument.

In order to facilitate observation of the several pointers, an adjustable marker 24 is provided on each side of the upper portion of the housing. As shown in Figure 4, the upper edges of the housing are provided with beads 25, on which the markers are slidably mounted. For purposes of illustration the markers have been shown equipped with set screws 26, but I wish it to be clearly understood, however, that any other means may be provided for retaining the markers in adjusted positions.

It will be noted that the arrow heads 27, carried by the free ends of the pointers or hands 21, have the letters RR, LR, RF and LF on each side thereof, signifying that the pointers or hands are affected by right rear, left rear, right front and left front brakes respectively.

The instruments which may be electrically, mechanically or otherwise operated, may be calibrated, together with the several brake testing units, so that when proper retarding forces are applied to the vehicle wheels, all of the pointers will be in line, as shown in Figure 3, or the instruments and the brake testing units may be calibrated so that the retarding force of the front and rear sets of brakes may be actually indicated in terms of retarding torque.

When the indicating instrument is arranged in the pit, as shown in Figures 1 and 2, or when it is otherwise positioned so as to be visible from both ends of the testing apparatus, the arrow heads controlled by the front wheel brakes may be marked only on the side visible from a position adjacent the front of the vehicle, and the arrow heads controlled by the rear wheel brake testing units may be marked only on the side visible from the rear of the vehicle.

With this construction the marker on the side of the instrument adjacent the front of the vehicle could be positioned at the point at which the arrow heads should be if the front brakes are properly adjusted, and the other marker could be positioned accordingly for the rear brakes. Thus a man could be positioned at each end of the vehicle, and the adjustment and testing of the brakes would be facilitated.

Another form of the indicating instrument is shown in Figures 6, 7 and 8. In this form of my invention a plurality of instruments 28, 29, 30 and 31 are arranged so that the axis of the moving element of instrument 31 rotates with a tubular shaft 32 extending through the instrument. A pointer or hand 21' is fixed to the shaft 32 for indicating the influence of conditions on the instrument. Instrument 30 is also provided with a hollow shaft 33, which extends through tubular shaft 32 and carries a hand or pointer 21'. Instrument 29 carries a tubular shaft 34, which extends through shafts 32 and 33, and instrument 28 is provided with a shaft 35 extending through shafts 32, 33 and 34. Each of the shafts carries a hand or pointer 21' provided with an arrow head 27' having indicia thereon such as shown in the drawings and described in connection with the description of Figures 3 and 4. It will be appreciated that the construction herein set forth permits the position of the pointers or hands of several instruments to be observed on a single dial.

The instruments are encased in a suitable housing 36 provided with a dial portion 37. This portion of the casing or housing is of sufficient size to permit the longest pointer 21' to move therein. The front and rear walls of this portion of the casing are provided with openings through which the positions of the several pointers may be observed. These openings are preferably covered with transparent material 23' to protect the instruments from injury. Beads 25' are arranged on the outer edges of the member 37 on which are slidably mounted markers 24' similar to those hereinbefore described. The outer surfaces of member 37 adjacent the openings are provided with division lines, some of which are numeraled, for determining the position of the several pointers.

The instrument just described may be calibrated similarly to the instrument shown in Figures 3 and 4, and may be positioned relative to the testing machine, as shown in Figures 1 and 2. For mounting, the casing may be provided with a base 38 and a support 39.

It will be noted that in each form of my invention the several pointers are of different lengths, so that each arrow head carried thereby may be clearly visible at all positions of the pointers.

In operation, the several operating mechanisms of either form of indicating instrument are connected to the several brake testing units in such a manner as to be operated thereby. When the brake testing units are of the type which vary electrical energy, the instruments forming a part of the testing instrument may be voltmeters, ammeters or other electrical energy measuring devices. If the testing units are of the type herein described, as the load on the driving motor increases, the potential, as measured, will be increased. By calibrating the measuring instruments, the testing units and the dial, the positions of the pointers can be read directly in terms of brake resistance.

The instruments herein described are particularly advantageous for testing and equalizing brakes, in that the readings of all of the testing units are on one dial. If desired, the several measuring instruments and testing units can be calibrated so that all pointers will be aligned at a certain point on the dial when all brakes are properly adjusted, or calibrations can be made so that the pointers controlled by the rear brakes would be aligned, and those controlled by the front brakes would be aligned at a different position on the dial. It will be appreciated that in either event the testing and equalizing of the brakes will be facilitated.

While for purposes of illustration this invention has been described in connection with electrical brake testing units, I wish it to be clearly understood that the same may be used with other types of testing units. For instance, instead of employing electrical measuring instruments, mechanical, hydraulic or other types may be used, depending upon the circumstances. The markings on the dial have also been shown merely by way of example, and I wish it to be clear that any markings and numerical values found suitable for the particular testing apparatus employed may be substituted for those shown in the drawings.

While I have shown and described the preferred embodiment of my invention, I wish it to be understood that I do not confine myself to the precise details of construction herein set forth, by way of illustration, as it is apparent that many changes and variations may be made therein by those skilled in the art, without departing from the spirit of the invention or exceeding the scope of the appended claims.

I claim:

1. A brake testing structure comprising a plurality of brake testing units, each of which is associated with a brake carrying wheel of a vehicle, an alternating current electric motor associated with each testing unit adapted to drive a vehicle wheel against the resistance of its brake, each said motor having stator and rotor elements, one of said elements in each motor having provisions for connecting it to a source of electric current, an electrical indicating instrument associated with the other such element of each of the driving motors for measuring the retardation effect of the brake application, said instruments being located so that they may be read simultaneously.

2. A brake testing structure comprising a plurality of brake testing units, each of which is associated with a brake carrying wheel of a vehicle, an alternating current electric motor associated with each testing unit adapted to drive a vehicle wheel against the resistance of its brake, each said motor having stator and rotor elements, one of said elements in each motor having provisions for connecting it to a source of electric current, an electrical indicating instrument associated with the other such element of each of the driving motors for measuring the retardation effect of the brake application, said indicating instruments being associated for indicating the braking effects on a common dial visible from a point adjacent any of the wheels tested.

In testimony whereof I affix my signature.

HARRY H. SEMMES.